Feb. 16, 1932.  N. M. MICHAILOVSKY  1,845,316
FILTER
Filed Oct. 2, 1929   4 Sheets-Sheet 1
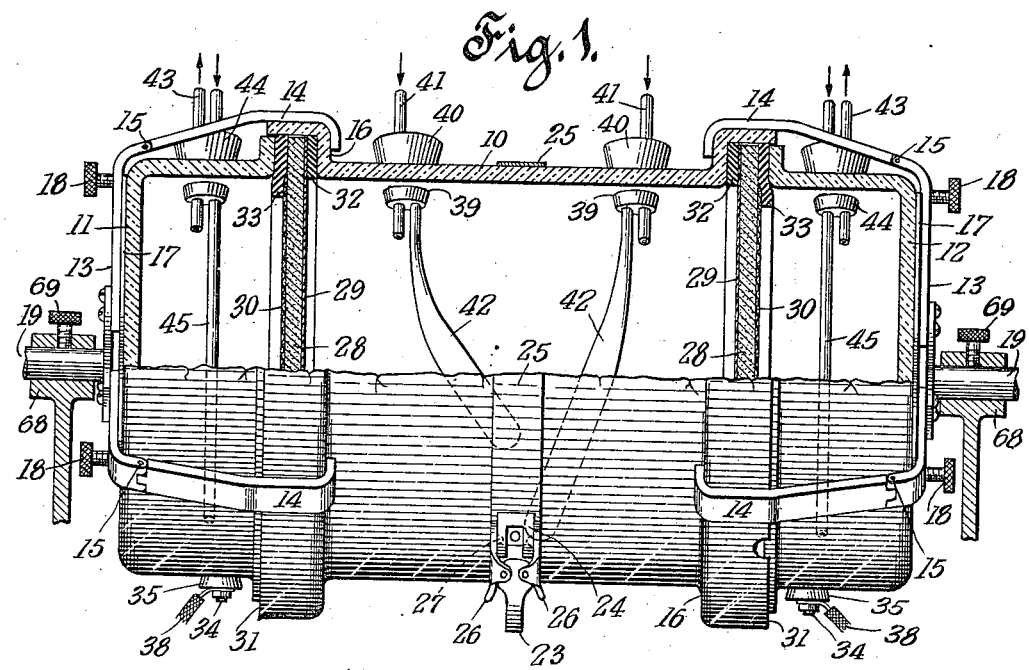
INVENTOR
Nicholas M. Michailovsky
BY
Philip S. McLean
ATTORNEY Feb. 16, 1932. N. M. MICHAILOVSKY 1,845,316
FILTER
Filed Oct. 2, 1929 4 Sheets-Sheet 2

INVENTOR
Nicholas M. Michailovsky
BY
Philip S. McBean
ATTORNEY

Feb. 16, 1932.   N. M. MICHAILOVSKY   1,845,316
FILTER
Filed Oct. 2, 1929    4 Sheets-Sheet 3

INVENTOR
Nicholas M. Michailovsky
BY
Philip S. McJean
ATTORNEY

Feb. 16, 1932. N. M. MICHAILOVSKY 1,845,316
FILTER
Filed Oct. 2, 1929 4 Sheets-Sheet 4

INVENTOR
Nicholas M. Michailovsky
BY
Philip L. McLean
ATTORNEY

Patented Feb. 16, 1932

1,845,316

UNITED STATES PATENT OFFICE

NICHOLAS M. MICHAILOVSKY, OF NEW YORK, N. Y., ASSIGNOR TO SHARIT CHEMICAL CO., INC., OF NEW YORK, N. Y., A CORPORATION OF NEW YORK

FILTER

Application filed October 2, 1929. Serial No. 396,608.

The present invention is what is termed an "ultra filter" or "electro-dializator", designed for chemical work such as separating crystalloidal substance from colloidal for example, or for filtering bacteria or whenever ultra filtration is needed.

The objects of the invention are to provide a filter for these special purposes, which will be particularly effective, rapid in operation as compared to present-day apparatus, which may be adapted to many different uses and which will be capable of operation to suit special requirements and the special materials under treatment.

The foregoing and other desirable objects are attained by certain novel features of construction, combinations and relations of parts as hereinafter described and broadly covered in the claims.

The drawings accompanying and forming part of this specification illustrate by way of example, some of the preferred embodiments of the invention, but it should be understood that the structure may be modified as regards these particular disclosures, without departure from the true spirit and broad scope of the invention.

Figure 1 is a broken part sectional front elevation of the filter.

Figure 2 is an end view of the same.

Figure 3:
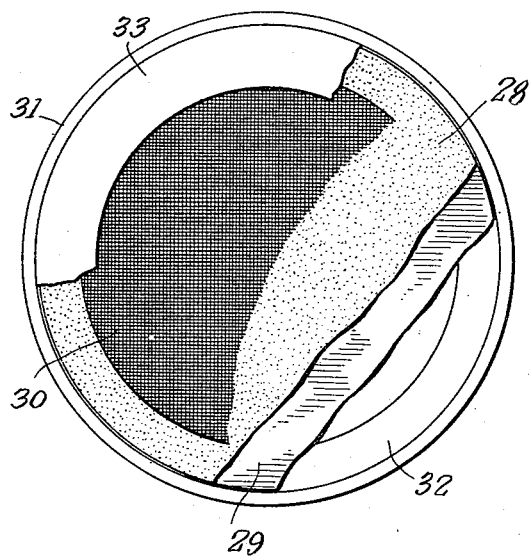
Figure 3 is a detail view of one of the filter walls with the various layers of the same broken away.

The form of the filter shown in Figure 1 consists of an intermediate cylindrical filter chamber 10 and two end chambers 11, 12, of glass, transparent quartz or the like to give full view to the action. The intermediate member is shown as an open ended cylindrical shell, and the ends members are shown as cylindrical closures applied over the open ends of the shell with filtering partitions therebetween.

The three main parts described may be removably secured together in any preferred way. As shown in Figures 1 and 2, the parts are clamped together by three-armed clamp members or spiders 13 applied over the ends of the end members, and carrying clamp hooks 14 pivoted at 15 and arranged to engage over annular shoulder portions 16, provided at the open ends of the intermediate filter chamber. Pads or plates 17 are shown interposed between the clamp spiders and the end walls of the filter sections to equalize the pressure and screws 18 are illustrated in the arms of the spider for pulling the clamps in tight holding relation.

Journal supports 19 are shown provided to engage the clamps centrally at 20 to rotatably support the filter structure, and in Figure 2, an oscillating motor of the type such as used with windshield wipers is indicated at 21 for oscillating the filter on its journals, said motor having an oscillating crank arm 22, connected by a pivoted link 23 with a lug 24 projecting from the under portion of the filter chamber. In this particular disclosure, the pivot lug 24 is shown as carried by a band 25, encircling the filter shell, and to enable quick connection and disconnection of the oscillating mechanism, the operating link 23 is shown as detachably connected with the lug 24 by the spring pressed jaws 26 pivoted on the end of the link and carrying pintles 27 entering pivot openings in the lug 24. This construction, it will be seen, enables the oscillating mechanism to be quickly and easily attached to or disconnected from the rotatably supported filter. The bearings 20 for the filter are shown as of the open type so that when the oscillating mechanism is disconnected, the entire filter structure may be lifted clear of its supports.

Figure 4:
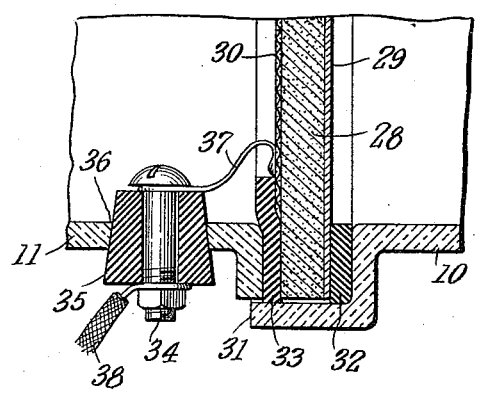
Figure 4 is an enlarged broken sectional detail view of one of the electrodes and the terminal connection therefor.

The filter walls at the ends of the filter chamber are shown in detail in Figures 3 and 4 as made up of porous discs 28, with layers 29 of filtering membrane or medium over the inner faces of the same and electrode screens 30 over the outer faces, the three layers described being releasably held clamped together in the annular enlargements 31 at the ends of the shell between gaskets 32 and 33.

The connections for the electrode screens are shown as carried through the end sections 11, 12 by terminal bolts 34 in plugs or stoppers 35 set in the openings 36 provided therefor, and having flexible wire connections 37 with the screens at the inside and wiring 38 at the outside. These connections can all be set up liquid-tight and at the same time, they permit of the parts being readily assembled and taken apart. To prevent a possible source of leakage, the electrode screens are shown as of less diameter than the internal dimensions of the end sections, so as not to actually extend in between the solid parts at the filter walls, and as held in place beneath the edges of the gasket rings 33, which for this purpose, are extended inwardly sufficiently to securely engage over the edges of the electrode screens.

The liquid or other substance to be treated is introduced into the intermediate filter chamber in the present disclosure, through openings 39, provided in the upper portion of this chamber and shown as closed by plugs 40, having liquid or gas introducing tubes 41 passed therethrough. These same plugs are shown as utilized for carrying blades or spoons 42 for mixing or stirring the material as the filter is oscillated. Rubber tubing or other flexible connections may be engaged with the liquid introducing tubes 41 so that the material may be gradually introduced as the operation proceeds. The location of these liquid entries adjacent opposite ends of the filter chamber enables the substance to be introduced and tested at will, adjoining either one or both of the electrodes, which latter may be oppositely polarized or connected with different kinds or values of electrical energy.

Figure 6:
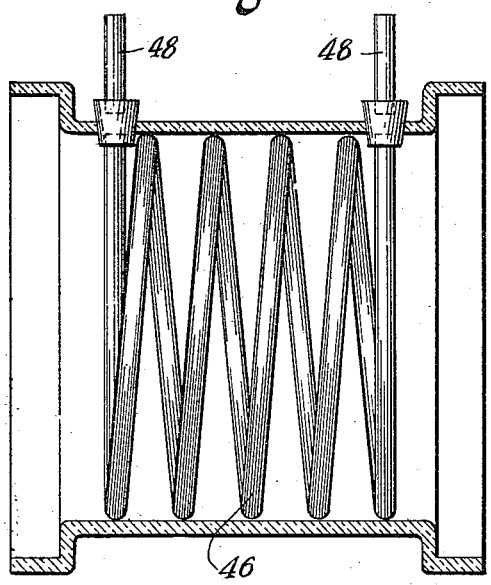
Figures 6 and 7 are sectional details illustrating internal and external methods of cooling the filter chamber.
Figure 7:
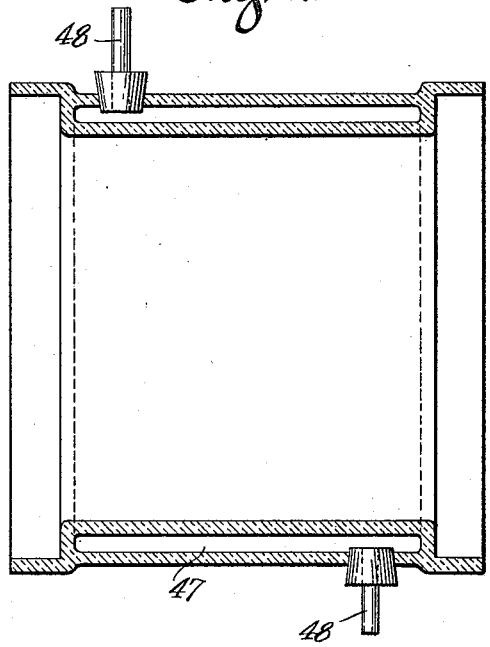

The filtrate may be withdrawn from the end chambers either as the filtration proceeds or at the end of the operation, as by means of tubing 43 entered through removable plugs 44, or this tubing may be utilized for the extraction of cooling or other liquid introduced into said end chambers by the tubing 45, shown carried by these same plugs. When cooling liquid is thus employed, it may be afterwards separated from the filtrate in known ways.

Where the filtering should be effected without admixing the water or other circulating fluid, a cooling coil 46 may be employed either inside or surrounding the filter chamber, Figure 6, or end chambers or water cooling jackets 47 may be provided about the chamber or chambers, as illustrated in Figure 7, suitable circulation connections being taken off, as indicated at 48 in these views.

The cooling effect may be combined with the electrodes by making these electrodes of hollow form and circulating a suitable cooling fluid or gas therethrough. In the example illustrated in Figures 8 and 9, the electrode 30a is shown as a mesh screen made up of small tubing or "hollow wire" 49, the ends of the tubes being shown as opening into an annular header or manifold 50 provided with the inlet and outlet connections 51 arranged at diagonally opposite points with respect to the mesh of the screen so that all tubes will be substantially equally effective to carry the circulating flow, from one connection 51 across to the opposite end through varying lengths of the manifold.

Figure 5:
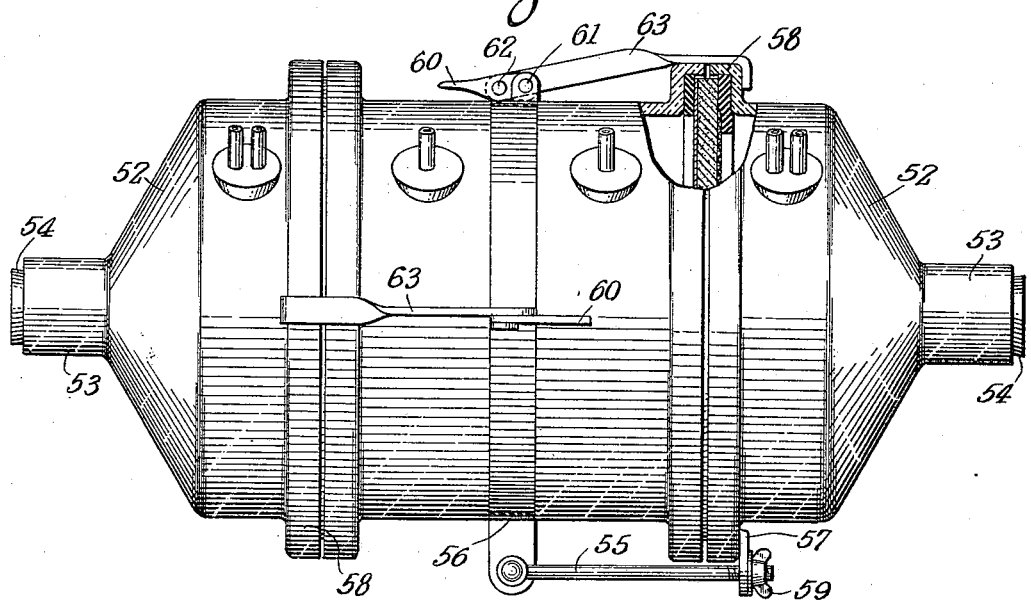
Figure 5 is a broken part sectional side elevation of a modified form of filter body.

The form of the invention illustrated in Figure 5 differs from the form first illustrated, particularly in that the ends of the filtrate chambers are shown as funnel shaped at 52 and as having hollow journals 53 closed by removable plugs 54. These hollow journals serve for the support of the filter and also enable the chambers to be quickly drained when desired, after the manner of funnels.

In Figure 5 also, different forms of clamps are shown for securing the sections together, in the shape of tie rods 55 pivoted to a ring 56 set in a recessed central portion of the filter chamber and carrying lugs 57 gripped over the annular shoulders or flanges 58 of the end cells by the wing nuts 59. This same view shows how toggle levers 60 may be used, pivoted on the center band at 61 and pivotally connected at 62 with the hook levers 63 engaging over the flanges of the end members. It will be understood from these illustrations that other fastenings may also be employed, the main requirement being that the three filter sections shall be securely and tightly fastened in end to end relation for the filtering operation, but be quickly releasable for taking down for cleansing purposes and the substitution of different parts and connections.

While usually the center chamber is the filter chamber, the operations may be reversed and an end chamber or chambers be used as the filter compartments. The action may be observed at all times and regulated as required in the matters of cooling, use of current, the mixing effect in the filter chamber, etc.

The washing of the liquid across the filter surfaces keeps the filter medium in the most effective condition. Suction may be applied to the end chambers to hasten the filtration. Direct current, pulsating or alternating current, either intermittently or continuously, may be employed at either or both terminals, and the use of the cooling fluid or gas enables the employment of the current most suited to the purpose, without overheating. By the use of these various controllable features, the filtration may be speeded up or slowed down to secure the best results. If desired, the oscillating mechanism may be disconnected or be connected and used only at intervals.

Figure 8:
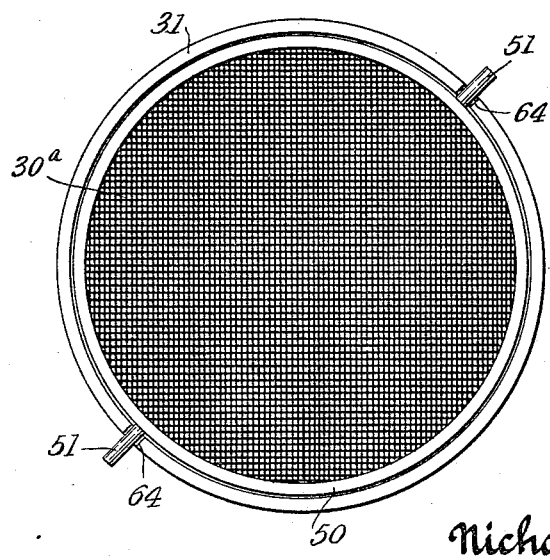
Figure 8 is a face view illustrating a form of water cooled hollow wire mesh electrode.
Figure 9:
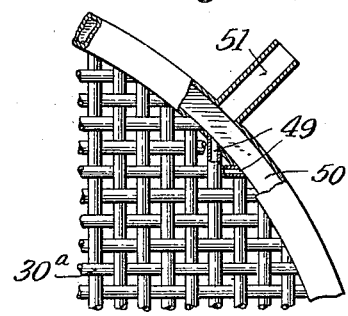
Figure 9 is a broken detail sectional view of this hollow wire mesh electrode illustrating in particular, the manifold connection for the wire mesh tubes of the electrode.

The electrodes may be cooled by the external circulating method exemplified by the tubing connections 43, 45 in Figure 1, or by the internal method illustrated by the hollow grid form shown in detail in Figure 9, or both forms of circulation may be used at the same time, it being intended, for example in Figure 1, that the electrode 30 may be either of ordinary wire mesh or of hollow form, such as shown in the detail view, Figure 9. In the latter instance it will be noted that as shown in Figure 8, the circulating connections 51 for the electrode may be brought out through notches 64, provided in the annular flange 31 of the intermediate filter shell.

Figure 10:
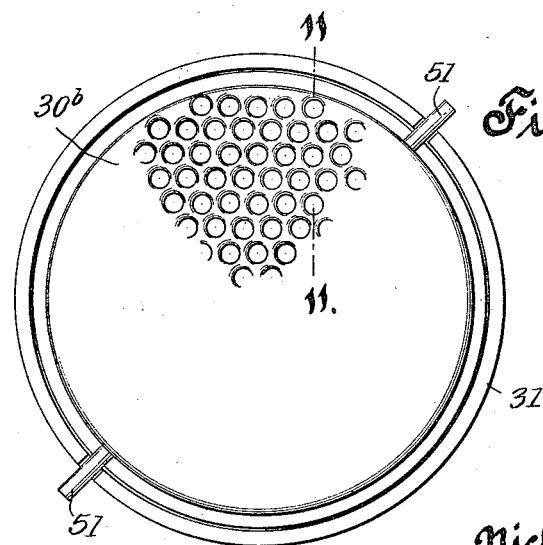
Figures 10 and 11 are elevation and sectional views respectively of another form of internally cooled electrode, the sectional view being taken on the plane of line 11—11 of Figure 10.
Figure 11:
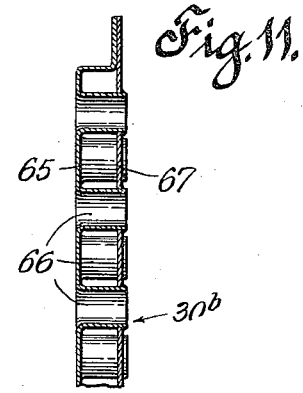

Figures 10 and 11 illustrate another form of internally cooled electrode made up of a plate 65 with punched out tubular extensions 66, providing filter passes and a second plate 67 secured in spaced relation, enabling the desired cooling circulation. While this is a simple, inexpensive way to make the electrode, it will be understood that it may be otherwise constructed to suit special requirements.

Figure 12:
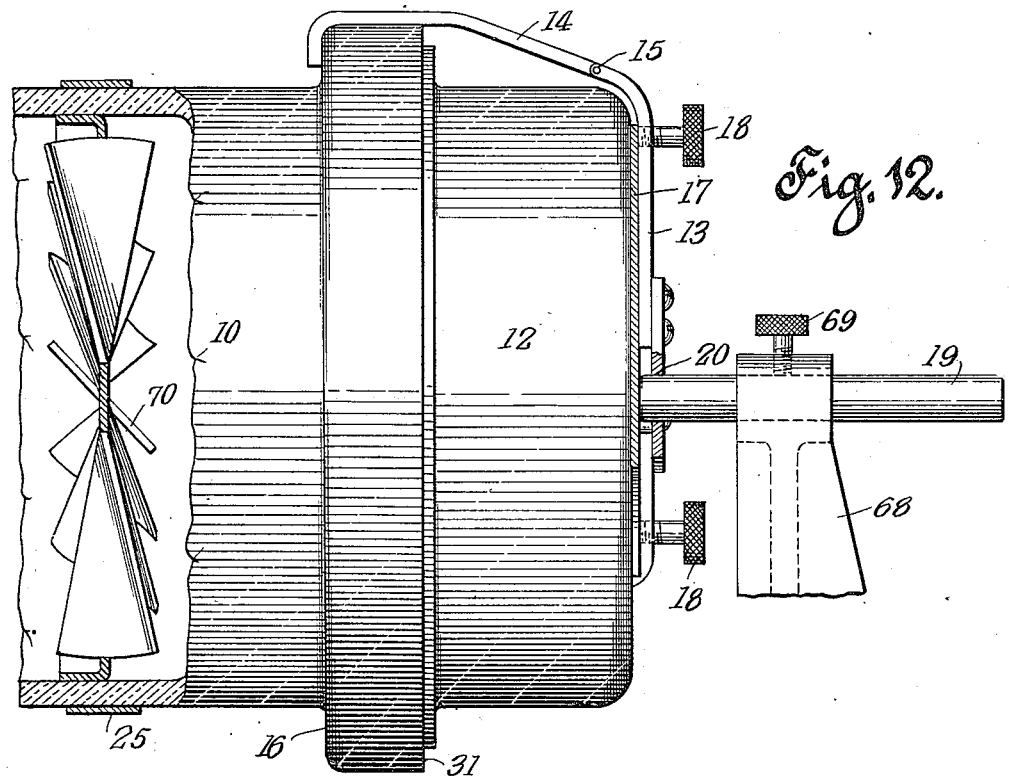
Figure 12 is a broken sectional view illustrating particularly the adjustable end bearing feature and showing a stirrer in the form of a propeller ring mounted in the filter chamber.

The supporting rods 19 for the filter are illustrated particularly in Figure 12 as removably and adjustably secured in the standards 68 by securing screws 69 which can be released to permit the rods being slid back out of the bearings 20 when the filter is to be removed. This adjustable mounting of the end supports also permits of the setting of the same to different lengths of filter cells, it being realized that longer or shorter filter chambers may be desirable for different operations. It will be seen, for example, that the same end chambers may be used with different lengths of intermediate filter chambers, or reversely, the same intermediate filter chamber may be used with different lengths of end chambers.

For some operations it is desirable to flow the liquid either one way or the other, or back and forth with respect to the two filter partitions and means may be provided for this purpose, as in the form of a propeller shown at 70 in Figure 12, removably and frictionally set in the intermediate portion of the filter chamber, where in the oscillation of the machine, it will impel the liquid first in one direction toward one filter wall and then in the opposite direction against the other filter wall. This is another feature of control which may be used or not in conjunction with the other features. The positive circulation aids in keeping the temperature uniform and may be employed in conjunction with the water cooled electrodes to maintain the temperature within a range suitable for certain bacteria or chemicals and to prevent destroying the material by overheating.

The inertia of the liquid in the filter chamber tends to cause it to remain at rest while the filter chamber oscillates, setting up frictional forces acting to wash adhering particles off the faces of the filter walls. The result therefore is to keep the filter partitions in the most effective condition.

By the use of electric current of opposite polarity at the two ends of the filter chamber, certain portions of the material will be attracted to one filter wall and other portions to the filter wall of opposite polarity. Under these conditions, it may be desirable to permit the thus segregated portions to accumulate in front of the respective filter walls. In these circumstances, agitating means may be undesirable, in which event, the stirring blades 42 or the propeller 70 or other agitating means would be omitted. The filtering elements 29 may be collodion membranes or the like. The use of suction with filtering membranes of this type is desirable and the employment of electrical forces in addition to the use of pressure, negative or positive, very materially speeds up the filter action. In order that the temperature may be known at all times, a thermometer or thermometers may be set in the chambers through the stoppers 40, 44, a convenient form of such a thermometer being one with the scale arranged to lay flat along the length of the filter on the outside, with the bulb portion extended inwardly at an angle through the plug or stopper.

The Figure 5 form of the apparatus is particularly desirable for certain operations, where it may be employed as an ordinary filter by removing one end section and placing the remaining intermediate and end sections vertically, with the tapered portion of the end section serving as a funnel construction, from which the filtrate can be drained through the tubular neck portion 53.

The use of flat membranes or flat porous surfaces to which collodion membranes can be directly applied either as a liquid or as a finished membrane is a distinct advantage, particularly in conjunction with the rotation of the filter on a longitudinal axis, which action as above described, washes these filter walls in a way to keep them most effective. This also keeps the filtering conditions substantially uniform at both ends, the liquids tending to remain level in all three chambers. While the filter sections are shown as of cylindrical shape it should be understood that they may be made square, hexagonal or other cross sectional shapes.

Plain or internally cooled electrodes may be used interchangeably in the apparatus, or an electrode of one kind at one filter wall and an electrode of the other kind at the other filter wall to keep the contents at the temperatures desired, and the form of the electrode may be varied to suit the requirements. In one simple embodiment, the electrode consists simply of one or more tubes coiled spirally in "pancake" form and having terminals brought out at the edge for the circulating fluid.

It will be apparent that many changes may be made within the broad scope of this invention, and it should be understood, therefore, that the terms employed herein are used in a descriptive rather than in a limiting sense, except for such limitations as may be imposed by the state of the prior art.

What is claimed is:

1. A filter of the character disclosed, comprising in combination, horizontally alined intermediate and end filter chambers detachably connected together and provided with means for rotatably supporting the assembled structure on a horizontal axis and flat filter partitions between the chambers disposed vertically and substantially at right angles to the rotatable axis of the filter.

2. In combination, filter and filtrate chambers detachably connected together and mounted for movement on a horizontal axis, a substantially flat vertical filter partition between the chambers substantially at right angles to the horizontal axis and means for imparting rotary movement to the filter structure about the axis of support.

3. An ultra filter, comprising an open ended intermediate filter chamber and filtrate chambers detachably secured over the open ends of the filter chamber, filter partitions removably held between the end chambers and intermediate chamber and including porous walls each with a filtering surface at one side and an electrode at the opposite side of the same.

4. An ultra filter, comprising an open ended intermediate filter chamber and filtrate chambers detachably secured over the open ends of the filter chamber, filter partitions removably held between the end chambers and intermediate chamber and electrode screens over said filter partitions.

5. In a filter of the character disclosed, filter and filtrate chambers separated by a filter wall, an electrode at said filter wall and means for cooling said electrode, including the provision of cooling fluid connections with the electrode, said electrode being in the form of a screen made up of tubing in circulation with said cooling connections.

6. In combination, rotatably supported filter and filtrate chambers separated by a filter wall, a motor and a link actuated from said motor for oscillating the filter, said link having a readily detachable connection with the filter structure.

7. In combination, an open ended filter shell, end covers at the ends of said shell, filter partitions interposed between the ends of the shell and the end covers, gaskets at the opposite sides of said filter partitions, means for removably clamping the assembled structure in the relation described and electrodes overlying the faces of said filter partitions and removably held by certain of the gaskets aforesaid.

8. In combination, an open ended filter shell, end covers at the ends of said shell, filter partitions interposed between the ends of the shell and the end covers, gaskets at the opposite sides of said filter partitions, means for removably clamping the assembled structure in the relation described and journaled means at the ends of the end covers for rotatably supporting the assembled filter structure in readily removable relation.

9. In a filter of the character disclosed, separable filter sections, a filter wall between said sections, a gasket at the joint between said sections and an electrode screen overlying said filter wall and removably held by said gasket.

10. A filter of the character disclosed, comprising detachably coupled filter sections and bearing means rotatably supporting said coupled filter sections and adjustable for holding coupled filter sections of different lengths.

11. A filter of the character disclosed, comprising filter chambers detachably connected together in horizontally alined relation and rotatably supported on a substantially horizontal axis and a substantially flat vertically arranged filter wall between the horizontally connected filter chambers substantially at right angles to the horizontally rotatable axis of the filter.

12. A filter of the character disclosed, comprising filter chambers and a substantially vertical filter wall separating the same, said filter being mounted for rotational movement on a longitudinal substantially horizontal axis and means for imparting rotational movement to said filter on the longitudinal axis to thereby cause the filter contents to wash over the filter wall.

13. A filter of the character disclosed, comprising filter chambers, a substantially flat filter plate between said chambers, a removable film of filtering medium at one side of said filter plate and an electrode screen at the opposite side of said filter plate.

14. A filter having filter chambers separated by upright filter partitions, electrodes overlying said filter partitions, external electrical connections for variously electrifying said electrodes and fluid circulating connections with the separate filter chambers selectively controllable to regulate the liquid in the different chambers and thereby to variously control the active filter areas and the active areas of the electrodes.

15. A filter of the character disclosed comprising filter chambers and a filter wall separating the same, said filter being mounted for rotational movement on an axis substantially at right angles to the plane of said filter wall and means for oscillating said filter structure on said axis to wash the filter wall in the filter contents without substantially disturbing the contents.

In testimony whereof I affix my signature.

NICHOLAS M. MICHAILOVSKY.